March 12, 1929.　　　G. A. COZENS　　　1,704,692
BOX, CASE, AND THE LIKE HAVING HINGED LIDS
Filed April 6, 1928　　2 Sheets-Sheet 1

Inventor,
G. A. COZENS

March 12, 1929.　　　G. A. COZENS　　　1,704,692

BOX, CASE, AND THE LIKE HAVING HINGED LIDS

Filed April 6, 1928　　　2 Sheets-Sheet 2

INVENTOR
G. A. COZENS

Patented Mar. 12, 1929.

1,704,692

UNITED STATES PATENT OFFICE.

GEORGE ARTHUR COZENS, OF LONDON, ENGLAND, ASSIGNOR TO THE DECCA GRAMOPHONE COMPANY LIMITED, OF LONDON, ENGLAND.

BOX, CASE, AND THE LIKE HAVING HINGED LIDS.

Application filed April 6, 1928, Serial No. 267,954, and in Great Britain June 14, 1927.

The invention relates to improvements in boxes, filing cases, casings for talking machines and like receptacles having hinged lids, the object being to enable the lid, when raised to open the casing, to be set upright against the end thereof, and, when the lid is lowered to close the casing, to ensure that any gap or opening in the end of the casing shall be covered.

The invention consists in the combination of parts adapted for operation substantially as hereinafter described and as claimed in the appended claims.

Figure 7:
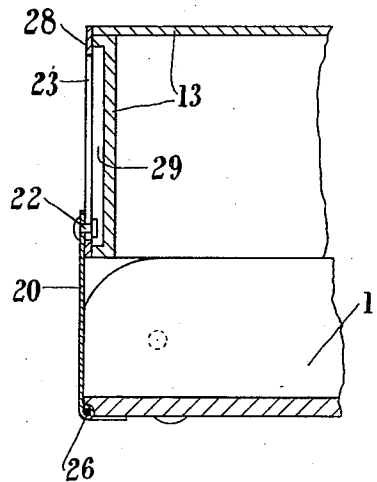
Figure 6:
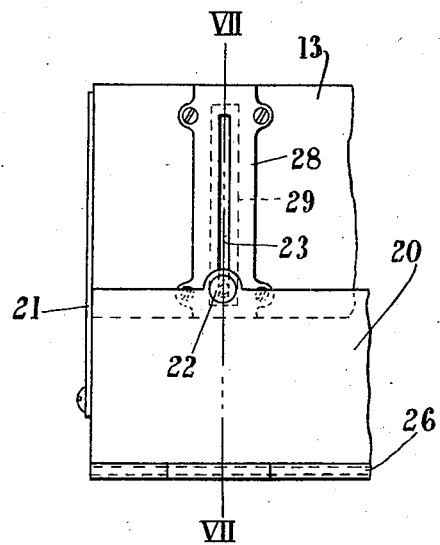
Figure 6 is a rear view of another form of casing.

Figure 7 being a side sectional elevation on VII—VII, Figure 6.

Figure 8:
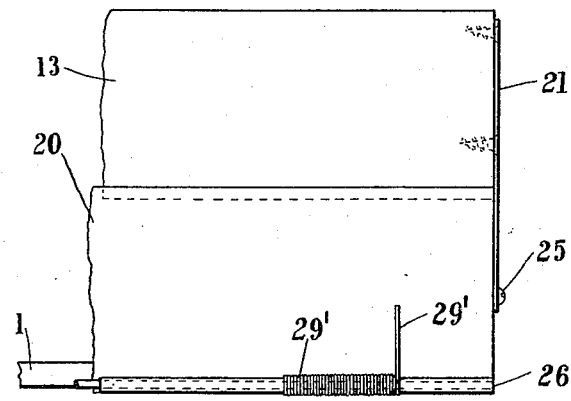

Figure 8 is a rear view of part of a further form of casing.

Figure 1:
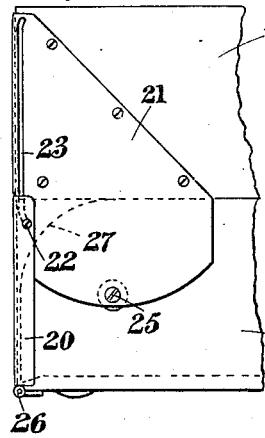
Figures 1, 2 and 3 are side elevations of part of the casing of a talking machine with the lid closed, fully open and partly open, respectively.
Figure 4:
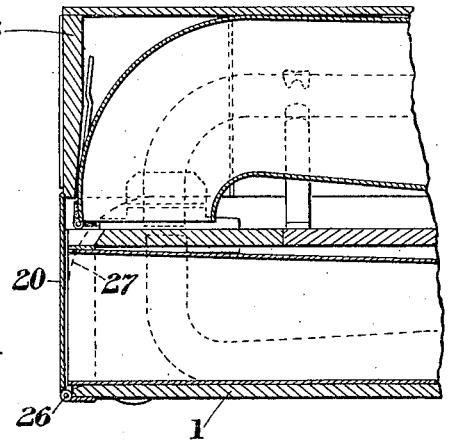
Figure 4 is a sectional elevation corresponding to Figure 1.
Figure 2:
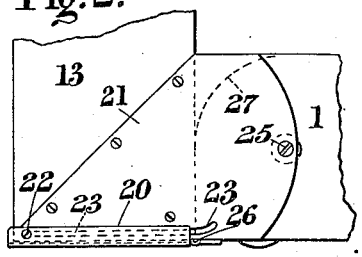
Figure 3:
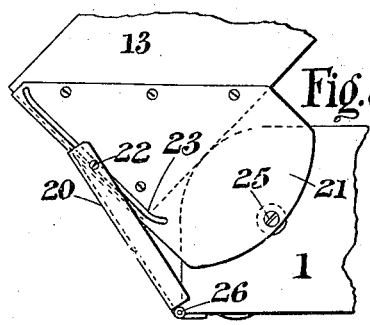
Figure 5:
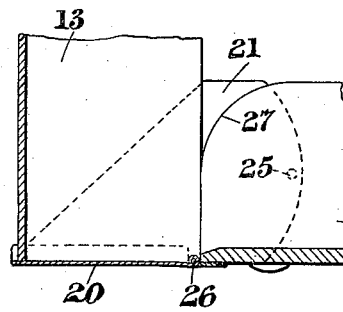
Figure 5 is a sectional elevation corresponding to Figure 2.

In the form illustrated the lid 13 is connected to the case 1 by hinge plates 21 extending down the sides of the case and pivoted thereto at 25 so that the lid can be moved from the closed position, as shown in Figures 1 and 4, to an upright position close against the end of the case with its ends or edge flush with the bottom of the case, as shown in Figures 2 and 5. The sides of the case at their ends are rounded off at 27 to allow clearance for the lid as it moves from its closed position to the upright position, it being understood that each pivot 25 must be situated at such a position that its distance from the lower edge of the end of the lid, when the lid is closed, is equal to its distance from that line on the end of the case where the said edge of the lid is to be situated in the open erect position, this line coinciding with the bottom edge of the case if the lid is to stand with its end flush with the bottom of the case as in example shown, although in other forms of casing the end of the lid need not be flush with the bottom of the casing. Each hinge plate 21 is preferably shaped, so that the edges of that part in contact with the case do not project beyond the edges of the casing in either the open or closed positions of the lid.

In order to close the gap left when the lid is closed, due to the rounding off at 27, or the whole end, when the case 1 has an open end adjacent to the lid 13, as in the example shown, a flap 20 is hinged at 26 to the end of the case 1 and is caused to move with the lid, for instance, it has flanges provided with pins 22 engaging in slots 23 in the hinge plates 21, the slots being so shaped that as the lid is opened and closed the flap is caused to follow its movements in close contact with it and securely closes the end of the casing when the lid is closed. Instead of the slots 23 being formed in the plates 21 one or more slots may be provided in the end of the lid to receive one or more pins on the flap, for example, as illustrated by Figures 6 and 7 wherein a slot 23 is formed in a plate 28 which covers a slot 29 in the lid 13 and receives a pin 22 on the flap 20. In the example shown in Figure 8, the flap 20 has no mechanical connection with the lid 13, but is provided with a closing spring 29'.

The converse arrangement may be adopted, namely, the plates 21 may be pivoted to the lid and the flap 20 be hinged to the lid, for example the part 13 in Figure 5 may be regarded as a case and the part 1 as the lid thereof.

I claim:

1. In combination a casing, a lid therefor having hinges comprising plates secured to the lid, extending down the sides of the casing, pivotally connected thereto and adapted to permit of the lid being raised into an upright position close against the adjacent end of said casing, a flap hinged to the casing at said end thereof and means adapted to allow said flap to move away from said end of the casing when the lid is raised and to move it against said end when the lid is lowered, substantially as and for the purposes hereinbefore set forth.

2. In combination a casing, a lid therefor having hinges consisting of plates secured to the lid and extending down the sides of the casing adjacent to one end thereof and pivotally connected to said sides, a flap hinged to the casing at said end thereof, and a pin and slot connection between said flap and said hinges for the purpose of ensuring movements of said flap to allow said lid to be set upright close against the end of the casing and to move against the end of the casing when the lid is lowered, substantially as hereinbefore set forth.

3. In combination a casing, a lid therefor having hinges comprising plates secured to the lid and extending down the sides of said casing and pivotally secured thereto, said hinge plates having slots therein, a flap hinged at its lower edge to the end of said casing adjacent to the hinges, said flap having flanged ends overlapping said hinge plates and carrying pins engaging within the aforesaid slots therein for the purposes hereinbefore set forth.

In testimony whereof I have signed my name to this specification.

GEORGE ARTHUR COZENS.